(12) United States Patent
Edsinger

(10) Patent No.: US 9,434,069 B1
(45) Date of Patent: Sep. 6, 2016

(54) MOTION HEAT MAP

(71) Applicant: Google Inc., Mountain View, CA (US)

(72) Inventor: Aaron Edsinger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 14/537,390

(22) Filed: Nov. 10, 2014

(51) Int. Cl.
*B25J 9/02* (2006.01)
*B25J 9/16* (2006.01)

(52) U.S. Cl.
CPC ............... *B25J 9/1607* (2013.01); *B25J 9/161* (2013.01); *B25J 9/1664* (2013.01); *B25J 9/1674* (2013.01); *G05B 2219/40318* (2013.01)

(58) Field of Classification Search
CPC ...... B25J 9/1607; B25J 9/1605; B25J 9/163; B25J 9/1664; B25J 9/1671; B25J 9/1674; G05B 2219/39061; G05B 2219/39329; G05B 2219/39323; G05B 2219/39364; G05B 2219/40523; G05B 2219/40454; G05B 2219/40318; G05B 2219/40198

See application file for complete search history.

(56) References Cited

U.S. PATENT DOCUMENTS 8,060,272 B2   11/2011 Peters, II
2006/0184274 A1   8/2006 Sakai et al.
2010/0241289 A1   9/2010 Sandberg
2011/0066282 A1   3/2011 Bosscher et al.
2013/0275922 A1   10/2013 Pinter et al.

FOREIGN PATENT DOCUMENTS

WO   2013176762   11/2013

OTHER PUBLICATIONS

Thomas et al., "Multi Sensor Fusion in Robot Assembly Using Particle Filters," Apr. 2007, Institute for Robotics and Process Control, Technical University of Braunschweig, Germany.*
Rybski et al., "Sensor Fusion for Human Safety in Industrial Workcells," Oct. 2012, Proceedings of the IEEE/RSJ International Conference on Intelligent Robots and Systems.*

* cited by examiner

*Primary Examiner* — Spencer Patton
(74) *Attorney, Agent, or Firm* — McDonnell Boehnen Hulbert & Berghoff LLP

(57) ABSTRACT

Examples are provided that describe a motion heat map. In one example, a method includes receiving, an input indicative of an environment including a robotic device. The method also includes receiving information associated with the robotic device such as operational characteristics of the robotic device and a range of motion associated with a component of the robotic device. The method also includes determining a motion per path metric associated with the component of the robotic device based on a simulated operation of the robotic device. The method also includes determining a force associated with the motion per path metric. Based on the force, determining a heat map to demonstrate a varying effect of motion of the component.

15 Claims, 13 Drawing Sheets

MOTION HEAT MAP

BACKGROUND

Unless otherwise indicated herein, the materials described in this section are not prior art to the claims in this application and are not admitted to be prior art by inclusion in this section.

Robotic devices may be used for applications involving material handling, transportation, welding, assembly, and dispensing, among others. Over time, the manner in which these robotic systems operate is becoming more intelligent, efficient, and more intuitive. Robotic devices are being expected to move and operate to perform new tasks and functions. A demand for efficient robotic devices has helped open up a field of innovation in actuators, movement, sensing techniques, as well as component design and assembly. As the use of robotic devices becomes increasingly prevalent in numerous aspects of modern life, the need for increased collaboration between humans and robotic devices becomes apparent.

SUMMARY

In one example, a method includes receiving, by one or more computing devices, an input indicative of an environment in which a robotic device resides. The robotic device may be configured to function within the environment. The method also includes receiving information associated with the robotic device. The information associated with the robotic device includes operational characteristics of the robotic device and a range of motion associated with a component of the robotic device. The method includes determining a motion per path metric associated with the component of the robotic device based on a simulated operation of the robotic device. The simulated operation includes moving the component along a given path within the range of motion for the component. The method also includes determining a force associated with the motion per path metric according to the simulated operation. Based on the force, the method also includes determining, by the one or more computing devices, a heat map to demonstrate a varying effect of motion of the component along the given path.

In another example, a non-transitory computer readable medium having stored therein instructions, that when executed by a computing device, cause the computing device to perform functions comprising: receiving an input indicative of an environment in which a robotic device resides. The robotic device may be configured to function within the environment. The instructions further include receiving information associated with the robotic device, wherein the information includes operational characteristics of the robotic device and a range of motion associated with a component of the robotic device. The instructions further include determining a motion per path metric associated with the component of the robotic device based on a simulated operation of the robotic device moving the component along a given path within the range of motion for the component. The instructions further include determining a force associated with the motion per path metric according to the simulated operation. Based on the force, the instructions further include determining a heat map to demonstrate a varying effect of motion of the component along the given path.

In another example, a method includes receiving, by one or more computing devices, an input indicative of an environment in which a robotic device resides. The robotic device may be configured to function within the environment. The method also includes determining a motion per path metric based on a simulated operation of the robotic device. The method also includes determining a force associated with the motion per path metric along one or more locations of the robotic device according to the simulated operation. Based on the force, the method also includes determining, by the one or more computing devices, a heat map to demonstrate a varying effect of motion according to the simulated operation.

In another example, a system is provided that includes a means for receiving, by one or more computing devices, an input indicative of an environment in which a robotic device resides. The robotic device may be configured to function within the environment. The system also includes a means for receiving information associated with the robotic device. The information associated with the robotic device includes operational characteristics of the robotic device and a range of motion associated with a component of the robotic device. The system also includes a means for determining a motion per path metric associated with the component of the robotic device based on a simulated operation of the robotic device. The simulated operation includes moving the component along a given path within the range of motion for the component. The system also includes a means for determining a force associated with the motion per path metric according to the simulated operation. Based on the force, the system also includes determining, by the one or more computing devices, a heat map to demonstrate a varying effect of motion of the component along the given path.

These as well as other aspects, advantages, and alternatives, will become apparent to those of ordinary skill in the art by reading the following detailed description, with reference where appropriate to the accompanying figures.

DETAILED DESCRIPTION

Figure 1:
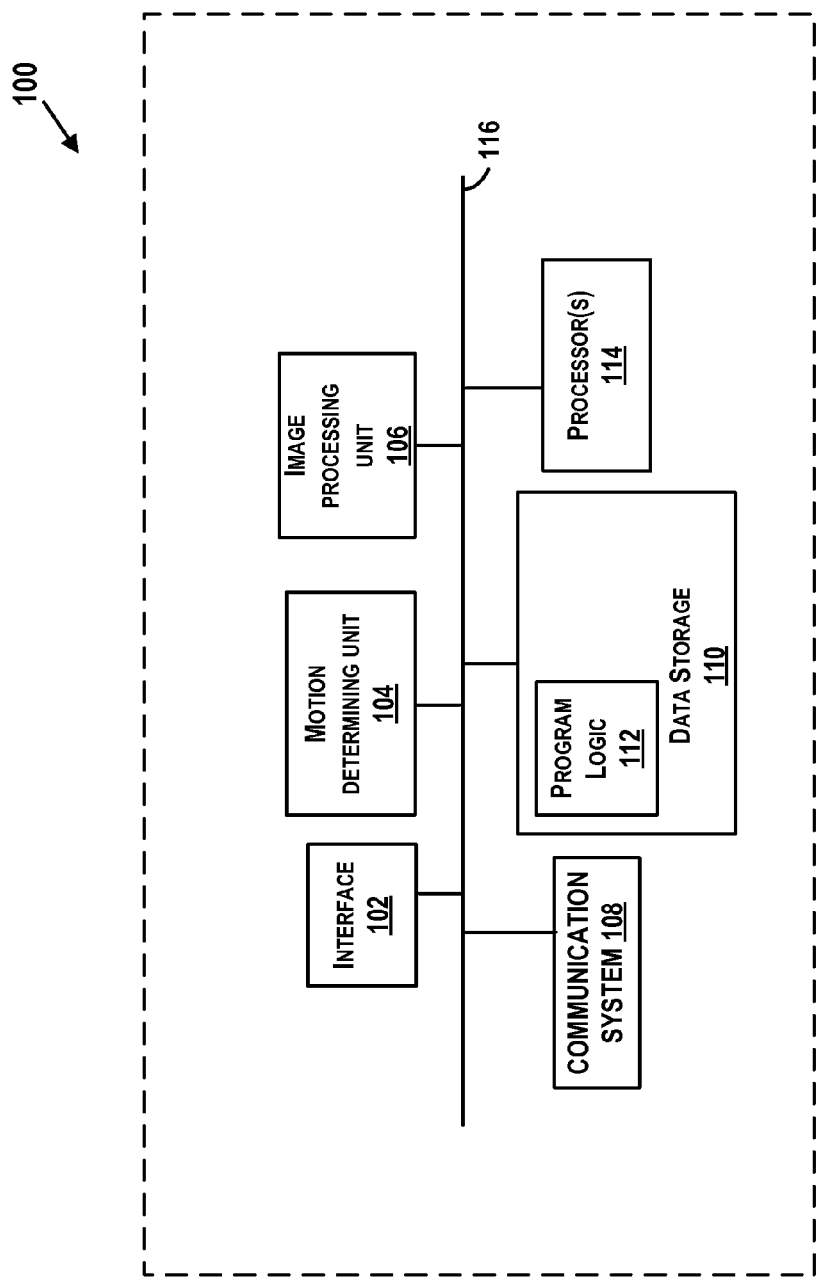
FIG. 1 depicts an example computer readable medium configured according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, one or more computing devices may be provided that are configured to receive an input indicative of a geometric layout of an environment. The environment may be a physical and/or geographical environment such as an outdoor space, an indoor space, an underwater space, a subterranean space, etc. For instance, the indoor space may include elements such as a doors, stairs, elevators, corridors, pathways, etc., that may influence a pattern of motion of people in the indoor space. In some examples, the indoor space may also include various machines such as a robotic device.

Further, in other examples, the one or more computing devices may be configured to receive information associated with elements pertaining to the environment. In one example, the one or more computing devices may be configured to receive information associated with the robotic device. By way of example, the information associated with the robotic device may include operational characteristics of the robotic device. For instance, the operational characteristics may include various operating modes, power requirements, load bearing information, known tools that may be coupled to the robotic device, transmission stiffness, stiffness of the robotic device covers, radius of curvature of the robotic device covers, and a range of speed associated with the robotic device. In this example, the range of motion associated with a component of the robotic device may also be received by the one or more computing devices.

By way of example, the one or more computing devices may be configured to determine a motion per path metric associated with a given component of the robotic device. For instance, the motion per path metric may be determined at any number of positions associated with the given component of the robotic device. In order to determine the motion per path metric, the one or more computing devices may be configured to perform a simulated operation of the robotic device. The simulated operation of the robotic device may be configured to simulate moving the given component along a given path within the range of motion associated with the component.

In one example, the one or more computing devices may be configured to determine a force associated with the motion per path metric according to the simulated operation. The force may be determined at various points along the given component associated with the robotic device. For example, a gripper tool may be coupled to the robotic device in order to assist with lifting an item nearby the robotic device. The one or more computing devices may receive a selection to determine the motion per path metric associated with the gripper tool in order to determine an associated safety of the gripper tool.

In another example, the one or more computing devices may be configured to determine a heat map to demonstrate a varying effect of motion of the given component along the given path. In one embodiment, the heat map is a graphical image. By way of example, characteristics of the heat map may vary within the graphical image. For instance, the heat map may comprise a plurality of regions. A given region of the plurality of regions may be associated with a color or luminous intensity that differs from one or more regions of the plurality of regions.

In other embodiments, the heat map may be represented through the use of an aural signal and/or a haptic signal. In one example, the aural signal may demonstrate a varying effect of motion by adjusting characteristics associated with a sound and/or decibel level associated with the aural signal. In another example, the haptic signal may demonstrate a varying effect of motion by providing vibrational feedback.

In one example, one or more regions of the heat map may have a characteristic according to the color red. In this example, the color red may be provided when a determined amount of force associated with the motion per path metric exceeds a safety threshold. The color red associated with the one or more regions may serve to indicate a level of safety associated with the simulation of the robotic device.

In another example, one or more regions of the heat map may have a characteristic according to the color blue. In this example, the color blue may be provided when the determined amount of force associated with the motion per path metric is below a safety threshold. The color blue associated with the one or more regions may serve to indicate the level of safety associated with the simulation of the robotic device.

By way of example, the one or more regions of the heat map may have varying characteristics according to a luminous intensity. The luminous intensity associated with the one or more regions may be used to draw attention to a particular area of the graphical image and convey safety information. The luminous intensity may be varied according to the safety of motion associated with the component of the robotic device.

Further, the one or more computing devices may be configured to provide for display the heat map overlaid onto a representation of the geometric layout of the environment. In one example, the environment may comprise a manufacturing warehouse that comprises the robotic device and corridors. In this instance, the robotic device may be configured to perform a function within the environment. By overlaying the heat map onto the representation of the geometric layout of the environment, it may be possible to determine if a real-life operation of the robotic would provide a danger to individuals in a given pathway that is adjacent to the robotic device.

Referring to the Figures, FIG. 1 is a block diagram of a computing device 100, according to an example embodiment. In some examples, some components illustrated in FIG. 1 may be distributed across multiple computing devices (e.g., desktop computers, servers, hand-held devices, etc.). However, for the sake of the example, the components are shown and described as part of one example device. The computing device 100 may include an interface 102, a motion determining unit 104, an image processing unit 106, a communication system 108, data storage 110, and a processor 114. Components illustrated in FIG. 1 may be linked together by a communication link 116. In some examples, the device 100 may include hardware to enable communication within the computing device 100 and another computing device (not shown).

The interface 102 may be configured to allow the computing device 100 to communicate with another computing device (not shown). Thus, the interface 102 may be configured to receive input data from one or more devices. In some examples, the interface 102 may also maintain and manage records of data received and sent by the computing device 100. In other examples, records of data may be maintained and managed by other components of the computing device 100. The interface 102 may also include a receiver and transmitter to receive and send data. In some examples, the interface 102 may also include a user-interface, such as a keyboard, microphone, touch screen, etc., to receive inputs as well. Further, in some examples, the interface 102 may also include interface with output devices such as a display, speaker, etc.

By way of example, the interface 102 may receive an input indicative of a geometric layout of an environment in which a robotic device resides. In this example, the environment may be a manufacturing warehouse comprising a robotic device that is configured to function within the manufacturing warehouse. The interface 102 may also be configured to receive information associated with the robotic device. For instance, the information associated with the robotic device may include operational characteristics of the robotic device and a range of motion with a component of the robotic device.

The motion determining unit 104 may be configured to simulate an operation of the robotic device moving the component along a given path within the range of motion for the component. Based on the simulated operation, the motion determining unit 104 may determine a motion per path metric associated with the component of the robotic device. Further, the motion determining unit 104 may be configured to determine a force associated with the motion per path metric according to the simulated operation.

The motion determining unit 104 may contain instructions that determine the force based on an open kinematic chain. The dynamic model may be based on:

$$M(q)\ddot{q}+C(q,\dot{q})\dot{q}+g(q)=\tau_{Total}. \quad [1]$$

In equation [1], the generalized coordinates q can be associated to the position of the links of the robotic device. M(q) is the symmetric, positive definite inertia matrix, the Coriolis and centrifugal terms are factorized using the matrix $C(q, \dot{q})$ of Christoffel symbols, and g(q) is the gravity vector. In the right-hand side of equation [1], $\tau_{Total}$ contains all active generalized torques performing working on q and all dissipative torques. From the skew-symmetry of matrix $\dot{M}(q)+2C(q, \dot{q})$ it follows that:

$$\dot{M}(q)=C(q,\dot{q})+C^T(q,\dot{q}). \quad [2]$$

The total energy of the robotic device is the sum of its kinetic energy and potential energy due to gravity:

$$E = T + U = \frac{1}{2}\dot{q}^T M(q)\dot{q} + U_g(q), \quad [3]$$

with $g(q)=(\partial U_g(q)/\partial q)^T$. From equation [1] and equation [2], it is $$\dot{E}=\dot{q}^T \tau_{Total}, \quad [3]$$

which represents the energy balance in the system. The generalized momentum of the robot is defined as $$p=M(q)\dot{q}. \quad [4]$$

Using again equation [1] and equation [2], the force is given by $$\dot{p}=\tau_{Total}+C^T(q,\dot{q})\dot{q}-g(q). \quad [5]$$

Thus, the motion determining unit 104 may be configured to determine the force, as shown in equation [5], that is associated with the motion per path metric. A motion heat map may be determined based on the force being above or below a threshold.

In another example, the motion determining unit 104 may also be configured to determine an applied pressure associated with the motion per path metric. In this example, the applied pressure may be helpful in order to take into consideration a sharp radius associated with a given component of the robotic device. For instance, a given joint of the robotic device may have a larger radius of curvature and thereby have the potential to cause less harm than a given manipulator of the robotic device with an associated smaller radius of curvature.

The image processing unit 106 may be configured to receive the determined force, and based on the force determine characteristics of the heat map. The characteristics of the heat map may vary in order to demonstrate a varying effect of motion of the component along the given path. The varying characteristics would allow the effect of motion of the component along the given path to be determined quickly in a similar manner to understanding a heat distribution of a given machine by viewing a heat map based on the given machine.

In one example, if the force is determined to be above a threshold that could cause injury to an individual depending on contact occurring between the individual and the component, then the characteristics of the heat map may vary according to one or more of color and luminous intensity. By way of example, if the force is determined to be above a threshold, then the visual characteristics of one or more regions of the heat map may be associated with the color red. In this example, other regions adjacent to the one or more regions that are not associated with the force may comprise a visual characteristic associated with the color blue in order to indicate safety. Other examples are possible as well.

The communication system 108 may include a wired communication interface (e.g., parallel port, USB, etc.) and/or a wireless communication interface (e.g., antenna, transceivers, etc.) to receive and/or provide signals from/to external devices. In some examples, the communication system 108 may receive instructions for operation of the computing device 100. Additionally or alternatively, in some examples, the communication system 108 may provide output data. In one example, the communication system 108 may be configured to provide for display the heat map overlaid onto a representation of the geometric layout of the environment.

The data storage 110 may store program logic 112 that can be accessed and executed by the processor(s) 114. The program logic 112 may contain instructions that provide control to one or more components of the computing device 100. For example, program logic 112 may provide instructions that adjust the simulated operation of the robotic device in order to determine a different motion per path metric. The data storage 110 may comprise one or more volatile and/or one or more non-volatile storage components, such as optical, magnetic, and/or organic storage, and the data storage may be integrated in whole or in part with the processor(s) 114.

The processor(s) 114 may comprise one or more general-purpose processors and/or one or more special-purpose processors. To the extent the processor 114 includes more than one processor, such processors may work separately or in combination. For example, a first processor may be configured to operate the motion determining unit 104, and a second processor of the processors 114 may operate the image processing unit 106.

Still further, while each of the components are shown to be integrated in the computing device 100, in some embodiments, one or more components may be removably mounted to otherwise connected (e.g., mechanically or electrically) to the computing device 100 using wired or wireless connections. The computing device 100 may take other forms as well.

Figure 2:
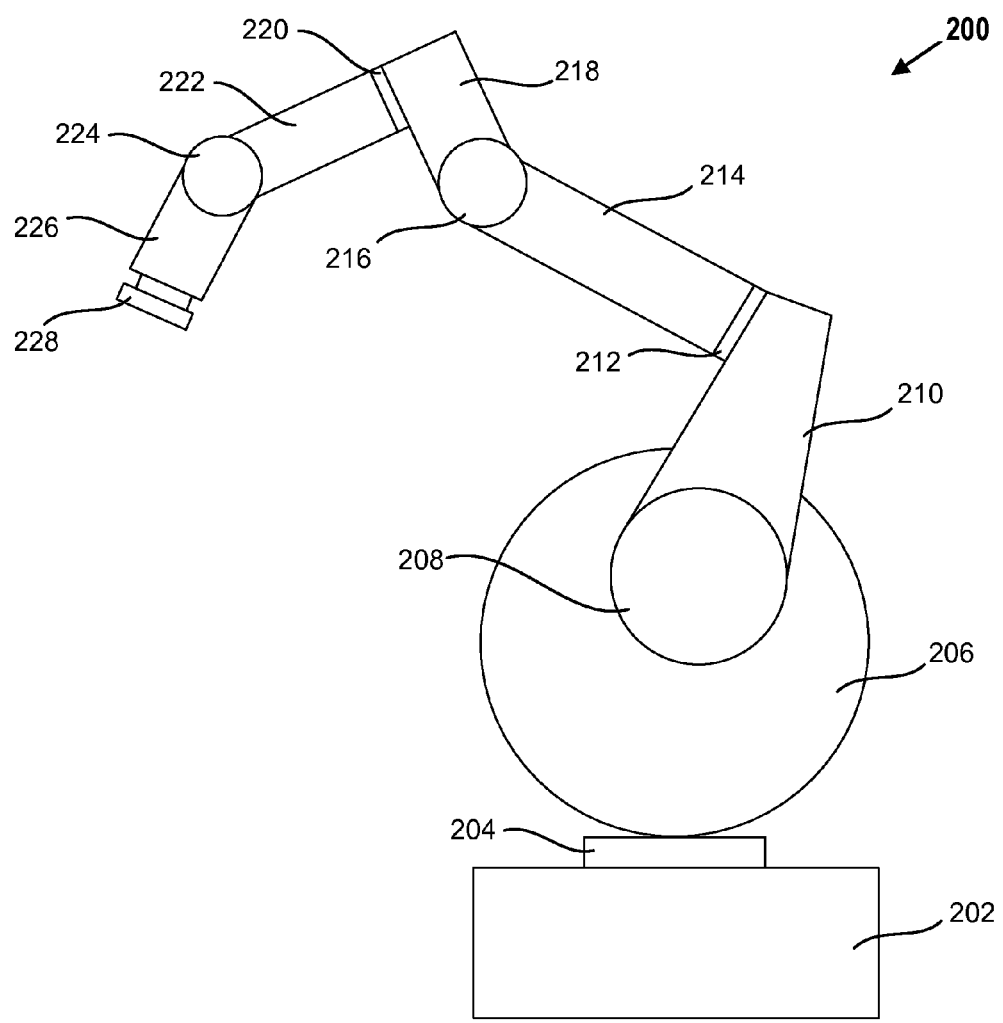
FIG. 2 illustrates an example robotic device.

FIG. 2 illustrates an example robotic device 200. The robotic device 200 may contain hardware, such as a processor, memory or storage, and sensors that enable the robotic device 200 to operate the robotic device for use in assembly operations, pick and place work, spot welding, etc. The robotic device 200 may be powered by various means such as electric motor, pneumatic motors, hydraulic motors, etc. The robotic device 200 includes a base 202, links 206, 210, 214, 218, 222, and 226, joints 204, 208, 212, 216, 220, and 224, and manipulator 228.

The base 202 may provide a platform in order to provide support for the robotic device 200. The base 202 may be stationary or be coupled to wheels in order to provide movement of the robotic device 200. The base may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements in order to accomplish a repetitive task over a period of time. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, and 224.

The joints 204, 208, 212, 216, 220, and 224 may be configured to rotate through the use of a mechanical gear system. In one example, the mechanical gear system may be driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, and 224 will allow for the links 206, 210, 214, 218, 222, and 226 to be moved in a way that allows the manipulator 228 to interact with an environment.

The manipulator 228 may be configured to allow the robotic device 200 to interact the environment. In one example, the manipulator 228 may perform appropriate placement of an element through various operations such as lifting, maneuvering, and gripping etc. By way of example, the manipulator may be exchanged for another end effector that would provide the robotic device 200 with different functionality.

The robotic device 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
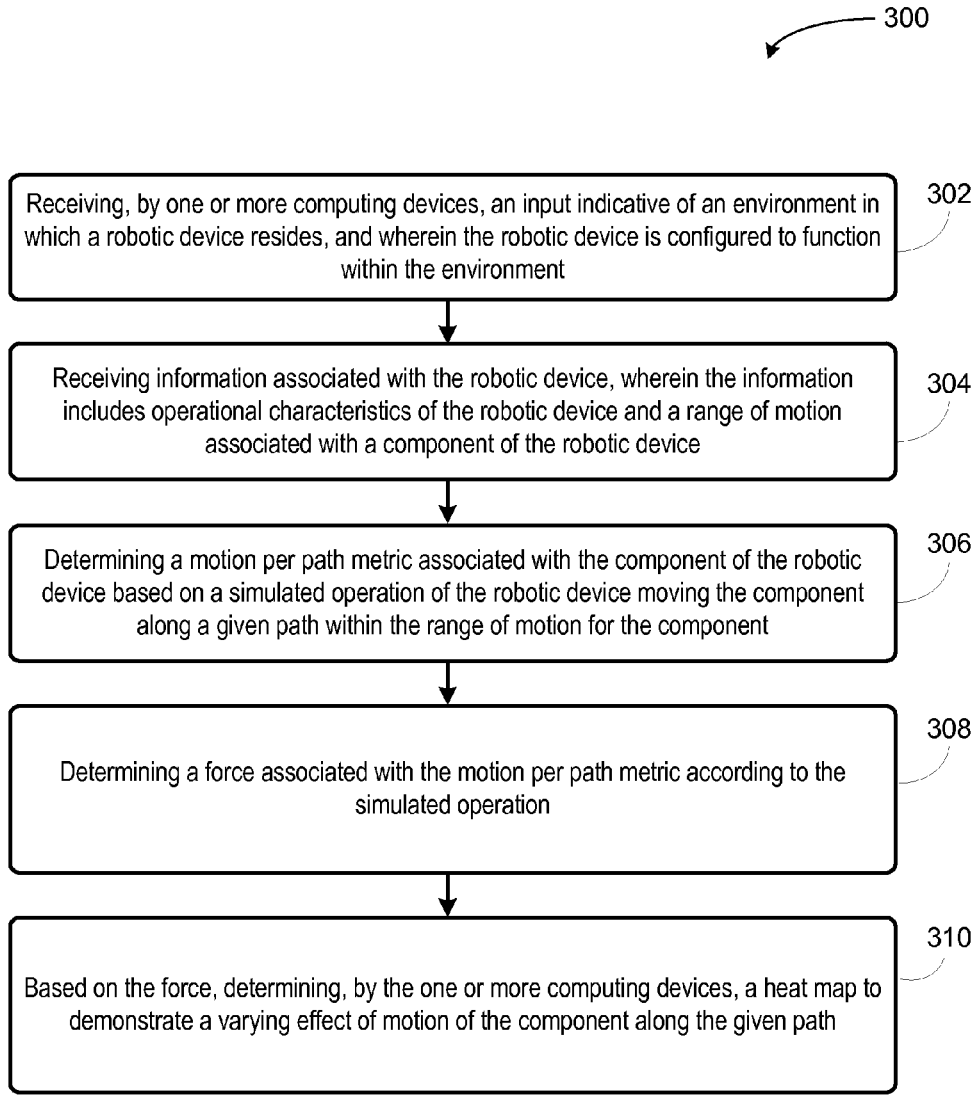
FIG. 3 is a block diagram of an example method for providing a motion heat map, in accordance with at least some embodiments described herein.

FIG. 3 is a block diagram of an example method for providing a motion heat map, in accordance with at least some embodiments described herein. Method 300 may include one more operations, functions, or actions as illustrated by one or more of blocks 302-310. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Illustrative methods, such as method 300, may be carried out in whole or in part by a component or components in the cloud and/or a robotic system, such as by the one or more of the components of the computing device 100 shown in FIG. 1. However, it should be understood that example methods, such as method 300, may be carried out by other entities or combinations of entities (i.e., by other computing devices and/or combinations of computing devices), without departing from the scope of the invention.

For example, functions of the method 300 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information. As other examples, the method 300 may be performed by a computing device, by a server, or by a robotic device.

As shown by block 302, method 300 includes receiving, by one or more computing devices, an input indicative of an environment in which a robotic device resides, and wherein the robotic device is configured to function within the environment. By way of example, the environment may be based on an indoor space such as a manufacturing facility. The manufacturing facility may comprise a plurality of rooms that include elements such as doors, windows, corridors, tables, computing systems, robotic devices, etc. In addition to these elements, the manufacturing facility may also include various personnel responsible for the operation of any number of elements. In one example, the one or more computing devices may be configured to receive the input indicative of the environment by interface 102 of computing device 100 as shown in FIG. 1.

FIGS. 4A-4D illustrate example functions associated with method 300.

Figure 4A:
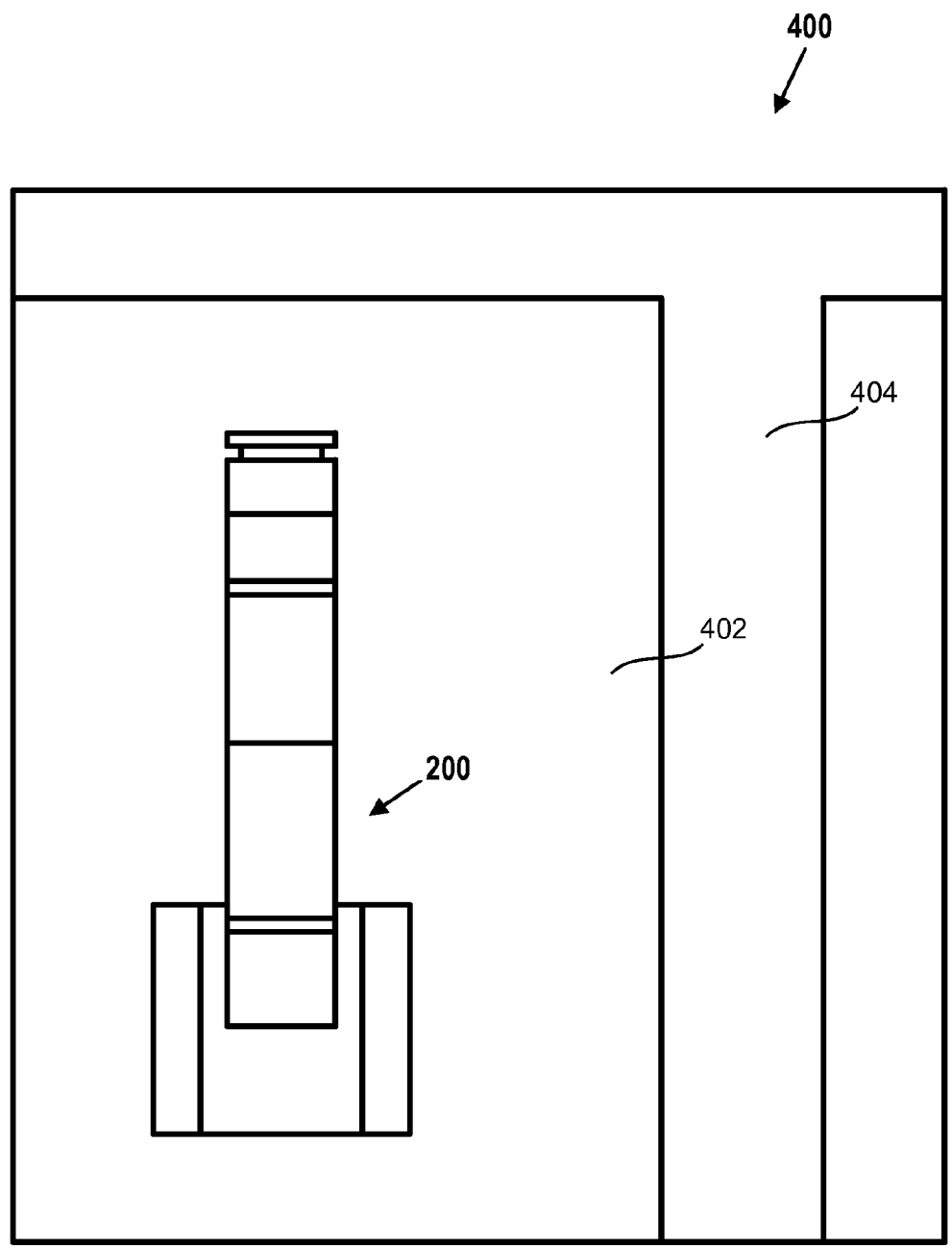
FIGS. 4A-4D illustrate example functions associated with an example method.

FIG. 4A illustrates an example environment 400 with the robotic device 200 from FIG. 2. As shown, FIG. 4A may correspond to a top-view of the example environment 400. It is noted that the relative dimensions in FIG. 4A are for exemplary purposes only. In other examples, the top-view may contain one or more additional areas associated with the example indoor space. Within the example environment 400, a robotic workspace 402 is shown adjacent to a corridor 404.

In this instance, the environment within FIG. 4A may be an example geometric layout associated with an input received at block 302 of method 300.

In one example, the robotic workspace 402 may need to be accessed in order to collaborate with the robotic device 200. Therefore, the robotic workspace 402 may potentially be an area of danger depending on an operation associated with the robotic device 200.

In another example, it may be desirable to view the associated risk with the operation of the robotic device 200 in relation to the corridor 404. The associated risk could help to determine the placement of the robotic device 200 within the workspace 402. This may also serve to reduce the risk associated operation of the robotic device 200.

The two-dimensional view shown in FIG. 4A provides an individual with a quick overview on how safety in a given area can be affected relative to the location and operation of the robotic device with regard to other elements such as the corridor 404. Depending on the amount of personnel that may be required to move through the example indoor space could determine the maximum speed and/or torque used to operate the robotic device 200.

Referring back to FIG. 3, in other examples, as shown by block 304, the method 300 may optionally include receiving information associated with the robotic device, wherein the information includes operational characteristics of the robotic device and a range of motion associated with a component of the robotic device. Information associated with the robotic device may allow the one or more computing devices to simulate an operation associated with the robotic device.

By way of example, the operational characteristics of the robotic device may include information that corresponds to the length, weight, and material used with the given component of the robotic device. In another example, the operational characteristics of the robotic device may include information such as the maximum and minimum speed associated with a given joint of the robotic device. Further, the operational characteristics such as the amount of torque associated with the given joint may also be provided to the one or more computing devices.

The range of motion associated with a component of the robotic device may be dependent on a given orientation associated with relative positions of example components of an example robotic device. The range of motion will help to determine possible movement associated with operation of the robotic device.

As shown by block 306, method 300 includes determining a motion per path metric associated with the component of the robotic device based on a simulated operation of the robotic device moving the component along a given path within the range of motion for the component.

In one example, the motion per path metric associated with the component of the robotic device comprises calculating one or more of an inertia, velocity and radius of curvature associated with the component. The motion per path metric may be calculated at any number of locations associated with a given component of the robotic device. For instance, the manipulator may have a higher motion per path metric based on the shape associated with the manipulator.

The simulation may receive inputs that adjust the operation of the robotic device. Adjusting the operation of the robotic device may allow for the adjustment of one or more variables associated with components of the robotic device. For example, the speed of the object may be reduced in order to decrease the force associated with the motion per path metric of a given component.

In one example, the simulation may be used to determine an optimal path for the component to traverse based on the safety so as to minimize risk during motion of the component along the optimal path. In this instance, it may be possible to adjust a position of one or more other components of the robotic device in order to determine the optimal path for the component.

Figure 4B:
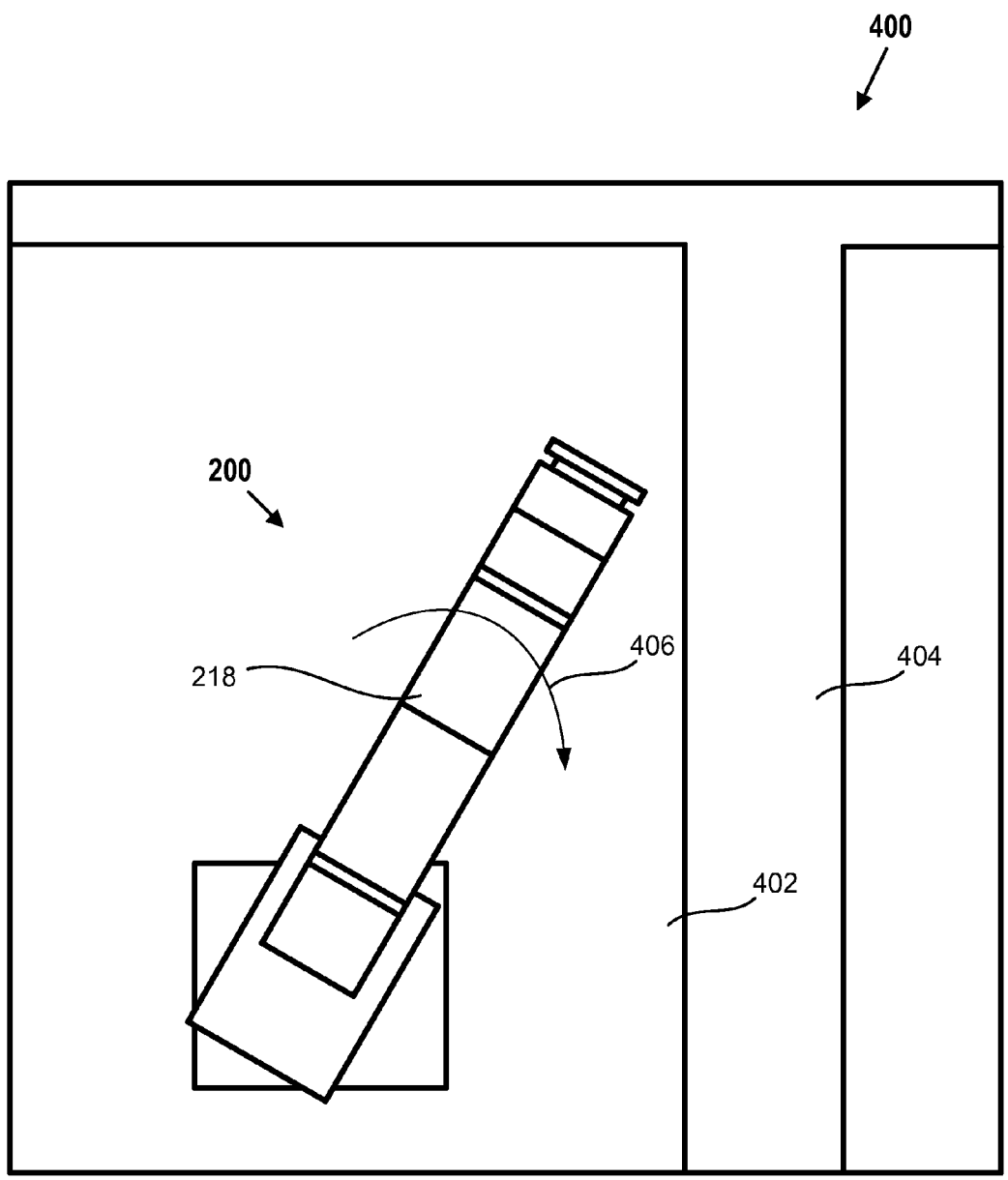

FIG. 4B illustrates the example environment 400 with the robotic device 200 from FIG. 2 according to a simulated operation. In this instance, the final position of the robotic device 200 according to a simulation of an operation is shown. The robotic device 200 is shown to have rotated according to the range of motion associated with a component of the robotic device 200.

Based on the simulated operation, the motion per path metric 406 associated with link 218 may be determined. The motion per path metric 406 may be calculated according to the equation 4 from above. The calculation may include one or more of inertia, velocity and radius of curvature associated with link 218.

Referring back to FIG. 3, in other examples, as shown by block 308, method 300 includes determining a force associated with the motion per path metric according to the simulated operation. The force may be used to determine the level of injury associated with a potential contact between the robotic device and an individual during the operation of the robotic device.

In one example, a given force may be above a threshold that could cause injury to the individual based on the height of the given link during the range of motion. For instance, a force of 45 Newtons may not cause injury to a lower extremity on an individual such as a thigh or foot of the individual. However, the force of 45 Newtons may cause injury to the neck of the individual and therefore it may be useful to know a vertical displacement associated with the given link. By way of example, based on the simulated operation of the robotic device, it may be possible to determine the height or vertical measurement of the given link during the range of motion in order to determine whether a force is above or below a safety threshold. In this example, the safety threshold could be based on the vertical measurement associated with the range of motion.

Figure 4C:
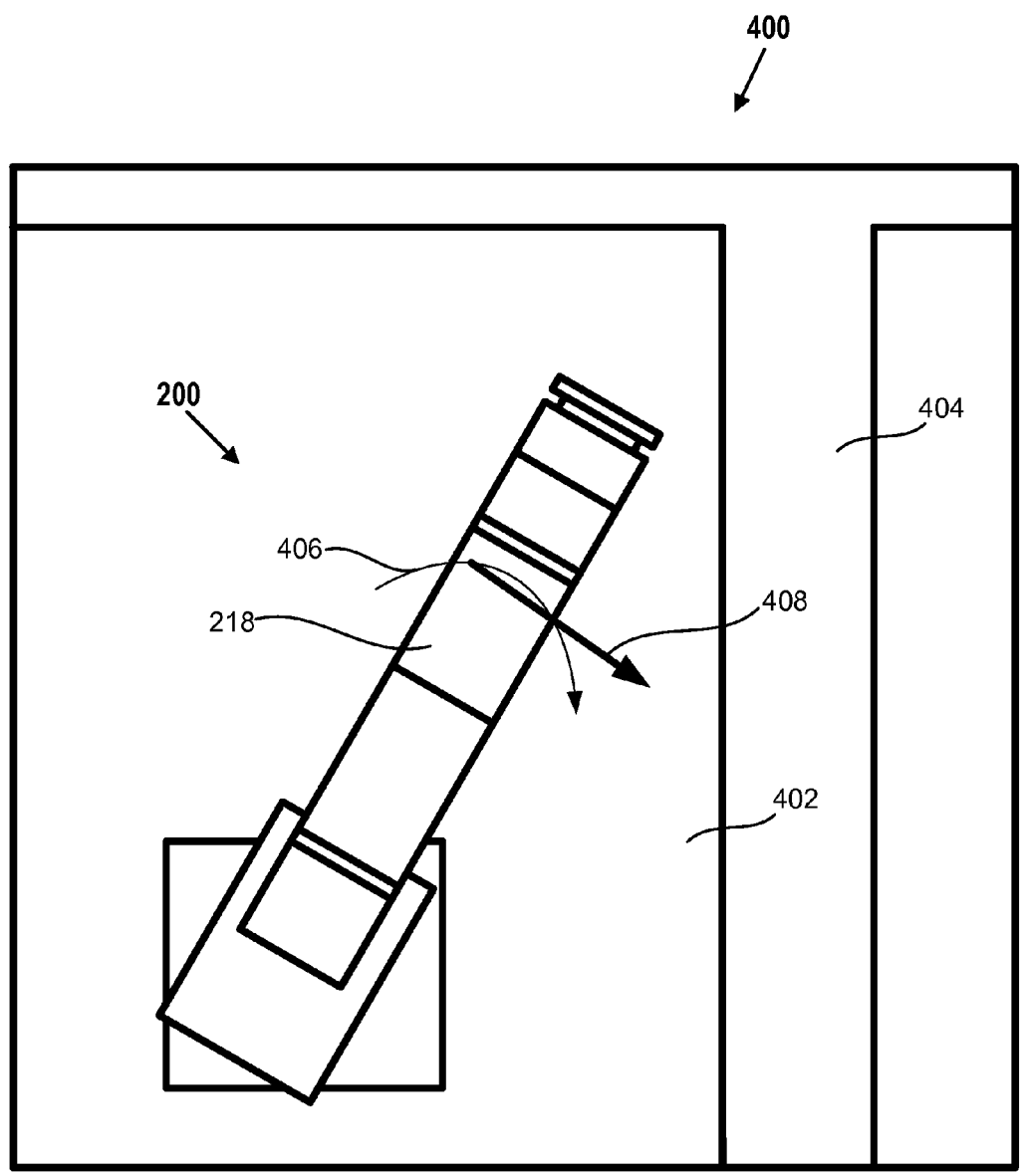

FIG. 4C illustrates the example environment 400 with the robotic device 200 from FIG. 2 according to a determined force. As shown in FIG. 4C, the force 408 is associated with the motion per path metric 406. In one example, the force 408 may be indicative of the one or more surrounding areas of the robotic device 200 that may provide an indication of potential harm of occurring.

In another example, the force 408 may be calculated based on the equation 5 from above. There may be other ways to calculate the force as well.

Referring back to FIG. 3, in other examples, as shown by block 310, method 300 includes based on the force, determining, by the one or more computing devices, a heat map to demonstrate a varying effect of motion of the component along the given path. Characteristics of the heat map may also be indicative of the different areas of safety surrounding the component along the given path.

In one example, the characteristics of the heat map may be determined according to the force being above or below a threshold. The threshold may be determined according to a vertical measurement associated with the range of motion. The vertical measurement may be associated with the threshold of force that is permissible to various regions associated with a human body. For instance, an upper extremity such as an elbow joint may have a threshold associated with 150 Newtons whereas the face of an individual may have a threshold associated with 65 Newtons.

In another example, the characteristics of the heat map may also be determined according to whether the force could cause an individual to fall down. For instance, a force of 75 Newtons may not cause injury to a lower leg of an individual however that same force may result in the individual losing balance and as a result of losing balance cause the individual to fall. In this example, the resulting fall could cause severe injury and therefore the characteristics of the heat map could be determined according to account for a potential accident involving a fall. This may also be the case depending on elements associated with a given environment such that are nearby the floor.

For example, the characteristics of the heat map comprise one or more of color and luminous intensity, wherein the characteristics vary according to the simulated operation. For instance, determining the characteristics of the heat map that vary within the heat map further comprises: varying the characteristics according to the range of motion associated with the component of the robotic device.

In another example, one or more regions of the heat map along the given path may comprise an increased luminous intensity with regard to the luminous intensity associated with a plurality of adjacent regions. This may serve to show where an injury between an individual and the robotic device may occur depending on contact. The increased luminous intensity with a given area may be easily identifiable within the graphical image.

In yet another example, one or more regions of the heat map have a decreased luminous intensity based on an increasing distance from the given path associated with the component. The decreased luminous intensity may help to give a better understanding of the safety associated with a given layout. The one or more regions may also be helpful in determining whether the placement of the robotic device is ideal based on the surrounding areas associated with the robotic device.

By way of example, one or more regions of the heat map may vary in one or more of color and luminous intensity according to the force. By varying the one or more regions in one or more of color and luminous intensity according the force, it may be possible to understand where a potential problem exists based on the simulation of the robotic device. For instance, varying the one or more regions could be helpful when there is a need or desired change to a manufacturing layout associated with the robotic device. This could allow a user to determine what potential danger there is in the new implementation of the manufacturing layout.

In another example, a method or system may include providing for display the heat map overlaid onto a representation of the geometric layout of the environment. In one example, the heat map may comprise one or more regions. In another embodiment, the heat map is a graphical image illustrating safety based on the one or more regions associated with varying characteristics.

Figure 4D:
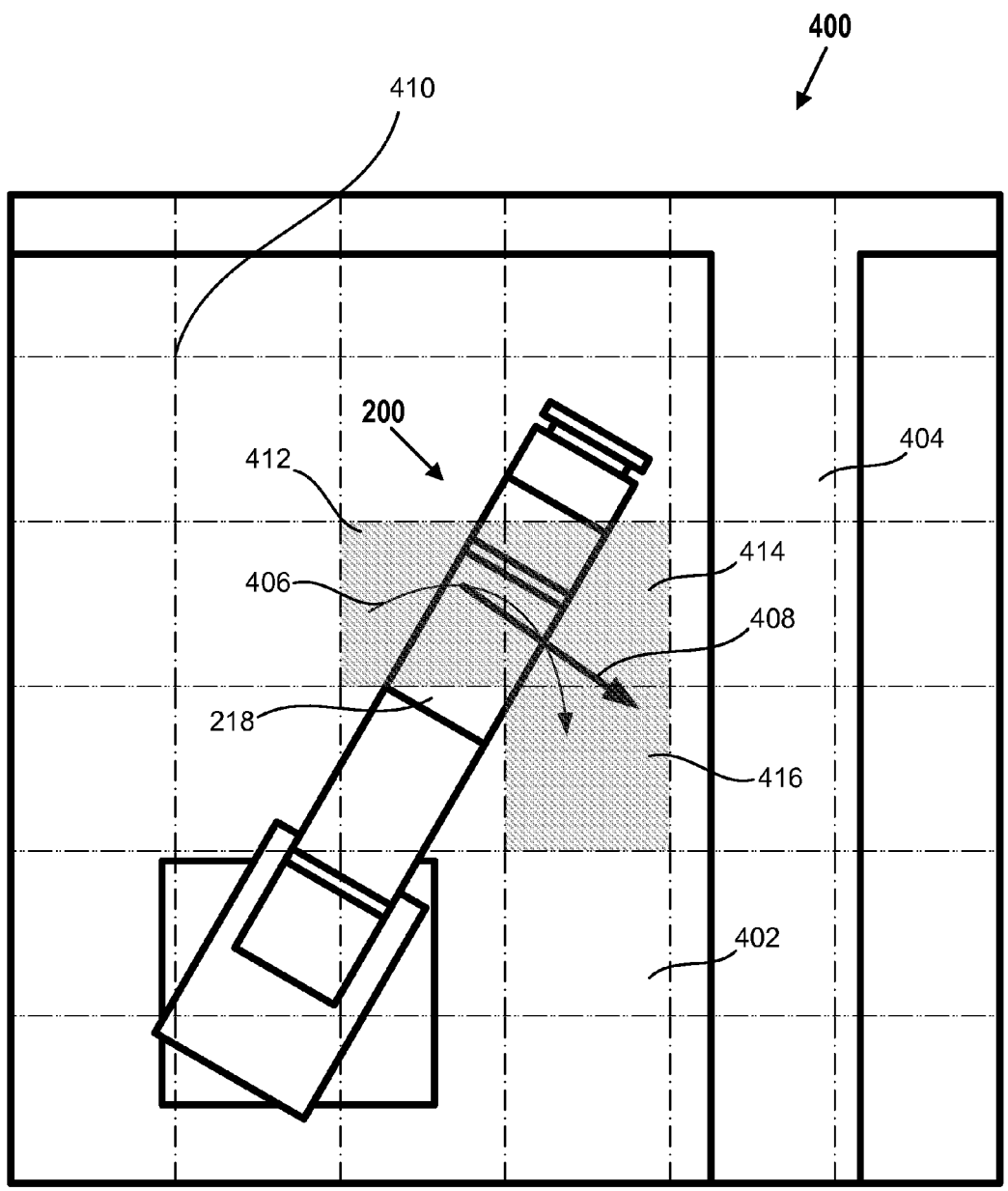

FIG. 4D illustrates a motion heat map associated with the example environment 400 with the robotic device 200 from FIG. 2. As shown in FIG. 4D, heat map 410 is overlaid onto the representation of the geometric layout of the example environment 400. The heat map 410 is divided into a number of regions. As shown in FIG. 4D, there are 36 regions associated with the heat map. However, the number of regions illustrated in FIG. 4D is not meant to be limiting. In other examples, a different number of regions may be used to depict the safety associated with the robotic device. As shown in FIG. 4D, the heat map 410 is a graphical image.

Referring to FIG. 4D, regions 412, 414, and 416 of the heat map 410 have been shaded in order to represent a characteristic of the heat map 410 such as color and/or luminous intensity. In one example, based on the simulated operation of the robotic device 200 moving the link 218 along a given path, force 408 associated with regions 412, 414, and 416 could be harmful if contact were to occur between the robotic device and an individual in a given region of the regions 412, 414, and 416. Therefore, in this example, those regions would serve to provide a motion heat map based on a simulation of the robotic device 200.

Further, since other regions within the heat map 410 may not be affected by the operation of the robotic device 200, they are shown without shading in FIG. 4D. In another example, using the simulated operation shown in FIG. 4D, the other regions within the heat map 410 could be displayed with the color blue in order to indicate a safe area. It is noted that any color or luminous intensity can be used to form the motion heat map.

As shown in FIG. 4D, the heat map 410 may be overlaid onto the representation of the geometric layout according to a position of the robotic device 200 within the geometric layout.

By way of example, the heat map 410 and the example environment 400 may be provided for display such as a computer display. In this example, an individual could choose to zoom in and/or zoom out to a given area of the example environment 400. Further, a second input associated with one more computing devices could be provided in order to determine how to provide the heat map 410. For instance, the second input could be indicative of a selection between a two-dimensional image and a three-dimensional image. This would allow the individual to interpret the motion heat map and have a better understanding why a particular region of the heat map is associated with characteristics indicative of potential danger. For example, the range of motion of the robotic device 200 may be better understood with a three-dimensional image based on the movement of one or more links of the robotic device 200.

Figure 5:
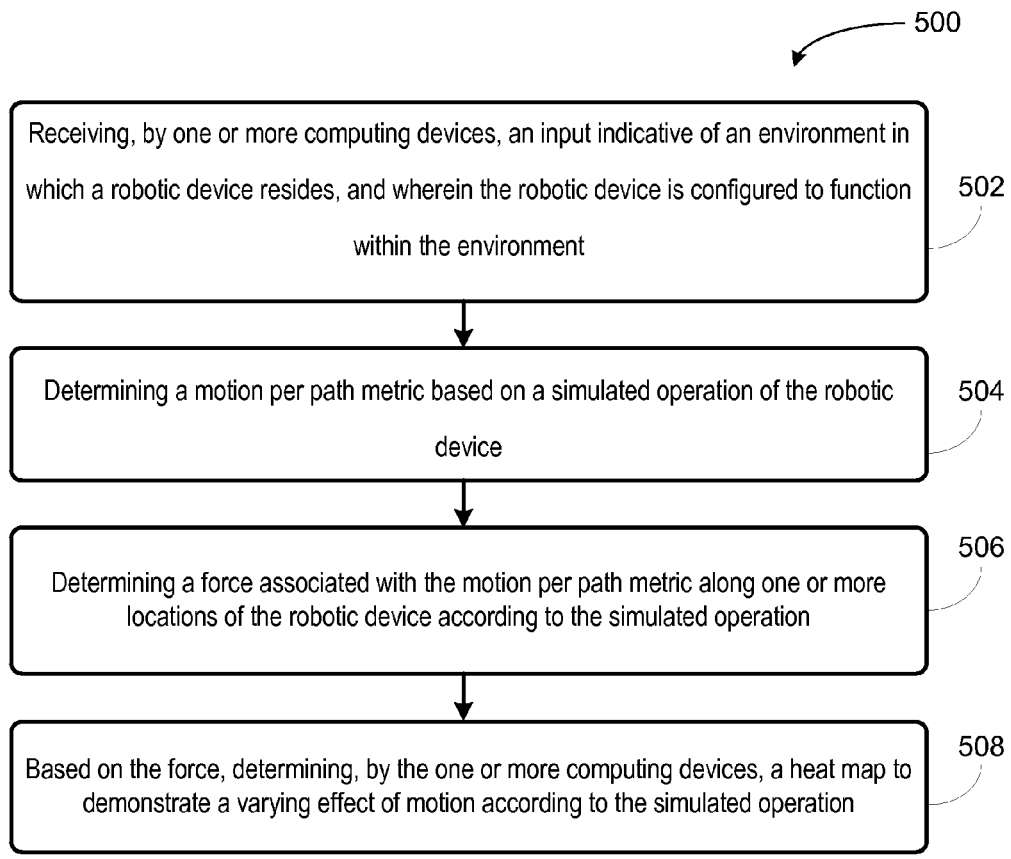
FIG. 5 is a block diagram of another example method for providing a motion heat map, in accordance with at least some embodiments described herein.

FIG. 5 is a block diagram of another example method for providing a motion heat map, in accordance with at least some embodiments described herein.

As shown in by block 502, method 500 includes receiving, by one or more computing devices, an input indicative of an environment in which a robotic devices resides, and wherein the robotic device is configured to function within the environment. Block 502 may be similar in functionality to block 302 of method 300.

As shown in by block 504, method 500 includes determining a motion per path metric based on a simulated operation of the robotic device. Block 504 may be similar in functionality to block 306 of method 300.

As shown in by block 506, method 500 includes determining a force associated with the motion per path metric along one or more locations of the robotic device according to the simulated operation. Block 506 may be similar in functionality to block 308 of method 300.

As shown in by block 508, method 500 includes based on the force, determining, by the one or more computing devices, a heat map to demonstrate a varying effect of motion according to the simulated operation. Block 508 may be similar in functionality to block 310 of method 300.

FIGS. 6A-6D illustrate example functions associated with method 500.

Figure 6A:
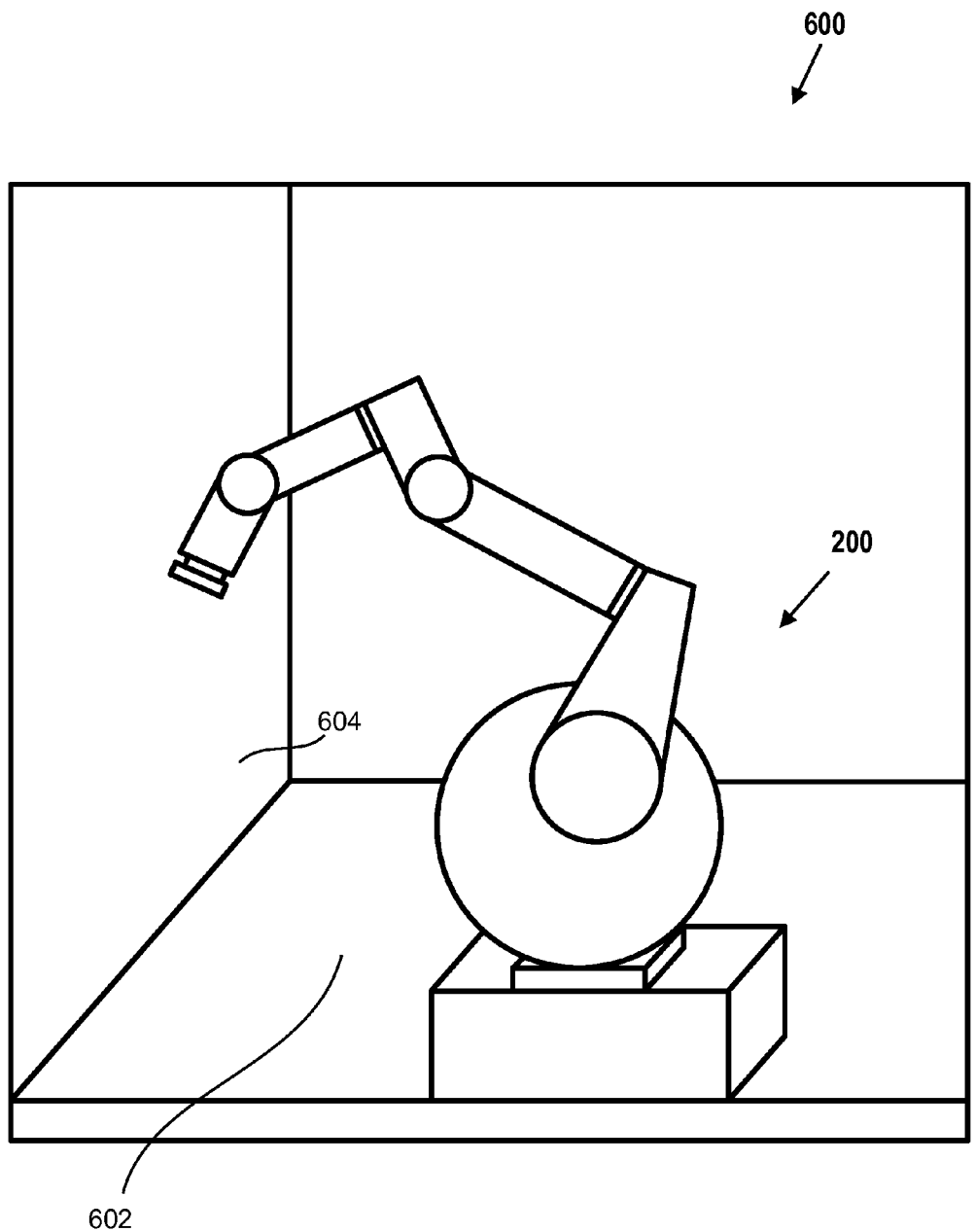
FIGS. 6A-6D illustrate example functions associated with another example method.

FIG. 6A illustrates an example geometric layout 600 with the robotic device 200 from FIG. 2. As shown, FIG. 6A may correspond to a three-dimensional view of the geometric layout 600 of an example environment. It is noted that the relative dimensions in FIG. 6A are for exemplary purposes only. In other examples, the three-dimensional view may contain one or more additional areas associated with the example environment. Within the geometric layout 600, a robotic workspace 602 and a wall 604 is shown.

Figure 6B:
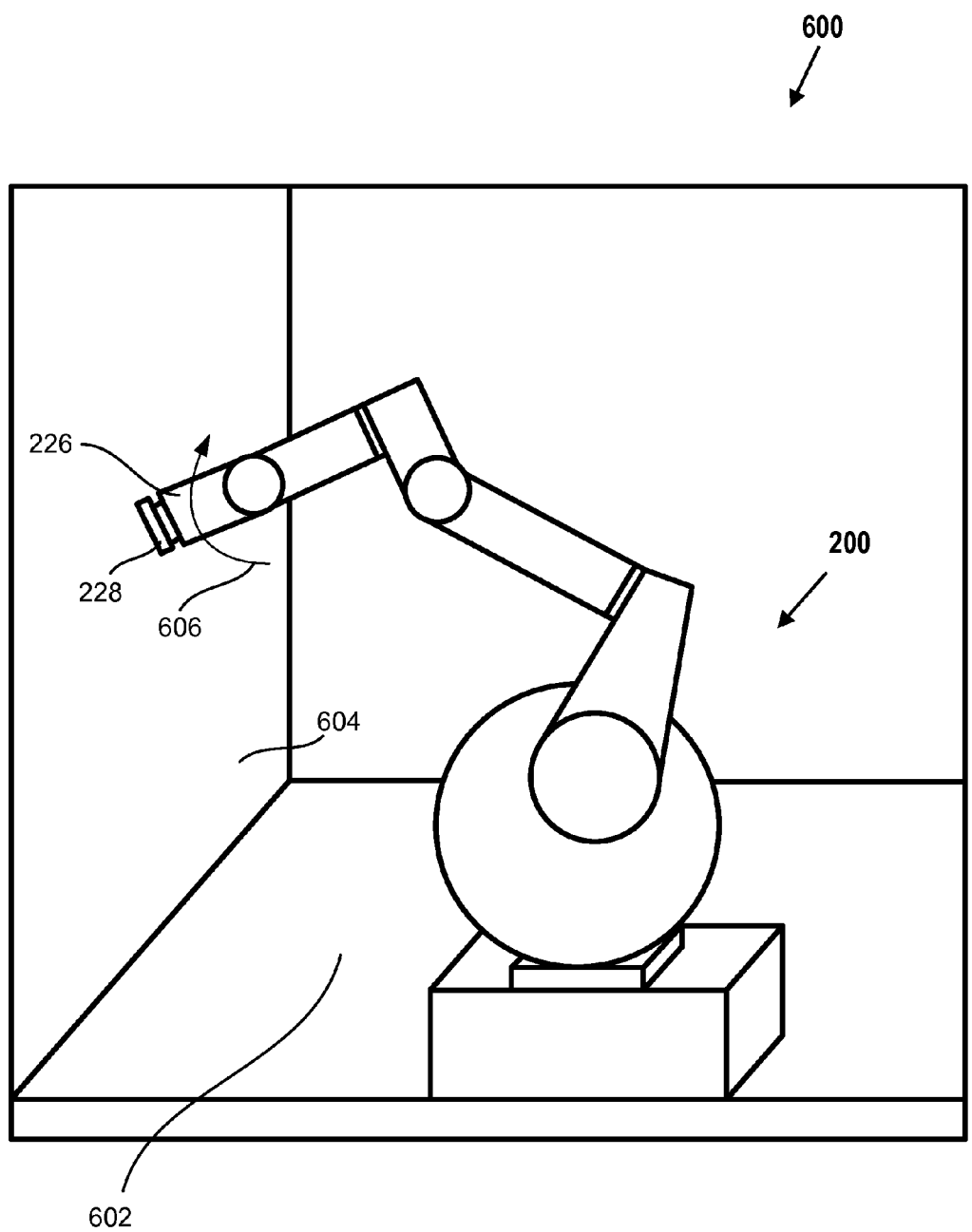

FIG. 6B illustrates the example geometric layout 600 with the robotic device 200 from FIG. 2 according to a simulated operation. In this instance, the final position of the robotic device 200 according to a simulation of an operation is shown. The robotic device 200 is shown to have rotated link 226 according to an upward movement based on a range of motion associated with the robotic device 200.

Based on the simulated operation, the motion per path metric 606 associated with link 226 may be determined. The motion per path metric 606 may be calculated according to the equation 4 from above. The calculation may include one or more of inertia, velocity and radius of curvature associated with link 226.

As shown in FIG. 6B, the motion per path metric 206 was determined according to the simulated movement of link 226. In other examples, it may be desirable to provide an input that is indicative of a selection associated with a given component of the robotic device 200. For example, depending on the manipulator 228 that is coupled to the robotic device 200, it may be useful to determine the motion per path metric 206 associated with the manipulator 228.

Figure 6C:
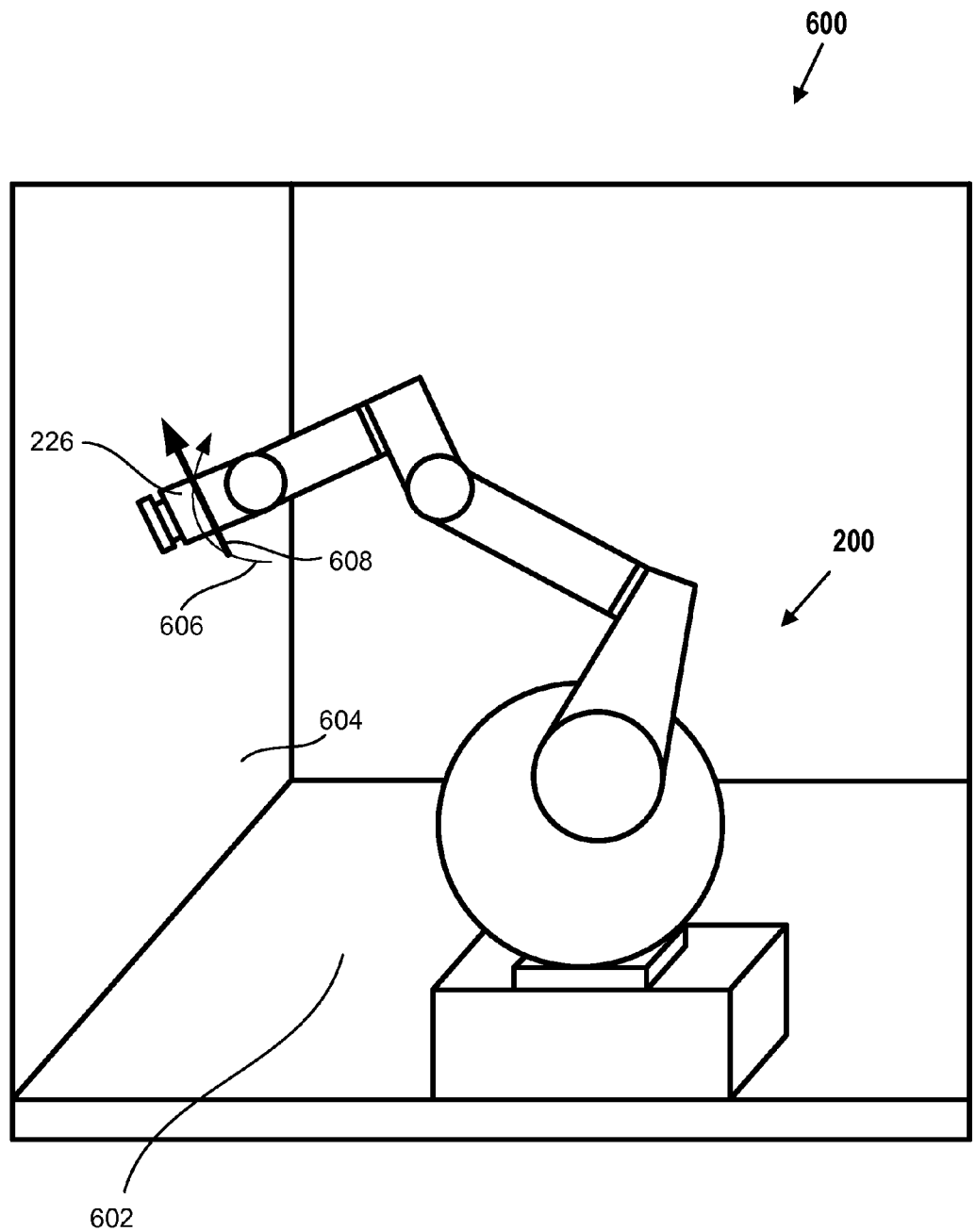

FIG. 6C illustrates the determination of the force 608 associated with the motion per path metric 606. In this example, based on the simulated movement of link 226, the force 608 has an upward movement as well. By way of example, a vertical measurement associated with the simulated movement could provide additional information with regard to the safety associated with the force 608.

Figure 6D:
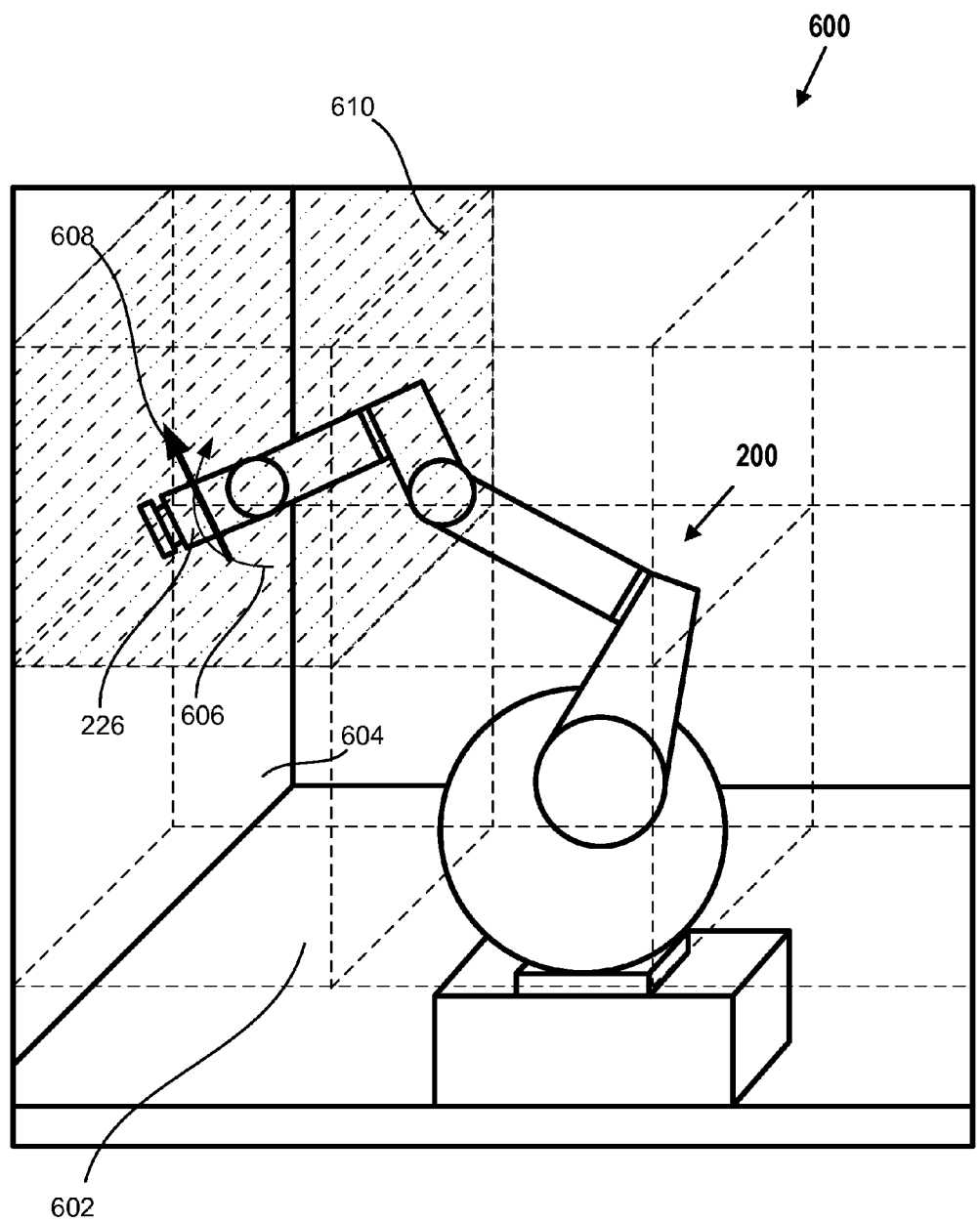

FIG. 6D illustrates a motion heat map associated with the example geometric layout 600 including the robotic device 200 from FIG. 2. As shown in FIG. 6D, a heat map 610 of the force 608 is overlaid onto a three-dimensional representation of the geometric layout 600. As shown in FIG. 6D, the heat map 610 is a visual representation.

By way of example, the visual representation 610 may be displayed as a voxel. In another example, the heat map of the force comprises a plurality of voxels along an x-axis, y-axis, and z-axis based on the three-dimensional representation of the geometric layout 600. Further, the plurality of voxels may vary in one or more of color and luminous intensity according to the force 608. The number of voxels illustrated in FIG. 6D is not meant to be limiting. In other examples, a different number and size of voxels may be used to depict the safety associated with the robotic device 200.

In another example, the visual characteristics associated with the heat map 610 of the force 608 may be determined according to the force 608 being above or below a threshold. In this example, the threshold may be determined according to a vertical measurement associated with the range of motion. The vertical measurement may help to determine which threshold to apply to the force 608.

For example, as shown in FIG. 6D, based on the range of motion associated with link 226, it may be possible that if the robotic device 200 were to make contact with an individual, the contact could occur at an upper body region such as the neck or face of the individual. The safety threshold associated with those upper body regions would be much lower than if contact occurs at a lower body region such as the pelvis or thigh of the individual.

In another example, there may be a plurality of voxels associated with the heat map 610 of the force 608. Based on the simulated operation, a given number of voxels of the plurality of voxels may be associated with a level of force that may not cause injury to an individual. In this example, it may be desirable to provide a second input that is indicative of a request to display one or more voxels of the plurality of voxels according to the force 608 being above a threshold. Further, the heat map 610 of the force 608 overlaid onto the three-dimensional representation of the geometric layout 600 may comprise a plurality of forces associated with safety of motion of the robotic device along the one or more locations.

Figure 7:
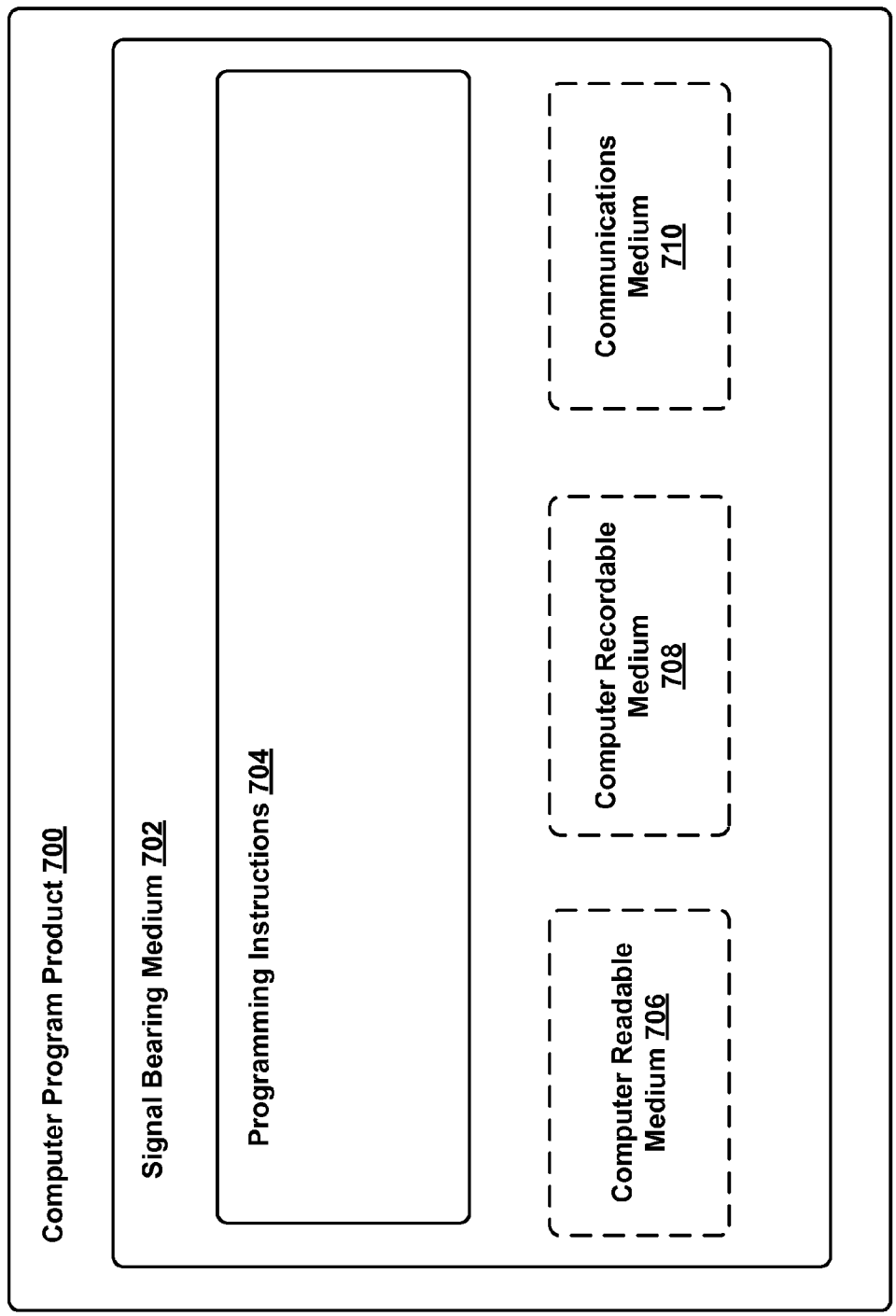
FIG. 7 depicts an example computer readable medium configured according to an example embodiment.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the device 100, method 300, method 500 etc.) may be implemented by computer program instructions encoded on a computer readable storage media in a machine-readable format, or on other media or articles of manufacture. FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by one or more computing devices, an input indicative of an environment in which a robotic device resides, and wherein the robotic device is configured to function within the environment;
receiving information associated with the robotic device, wherein the information includes operational characteristics of the robotic device and a range of motion associated with a component of the robotic device;
determining a motion per path metric associated with the component of the robotic device based on a simulated operation of the robotic device moving the component along a given path within the range of motion for the component;
determining a force associated with the motion per path metric according to the simulated operation;
based on the force, determining, by the one or more computing devices, a heat map to demonstrate a varying effect of motion of the component along the given path, wherein regions of the heat map vary in one or more of color and luminous intensity according to the force, and wherein one or more regions of the heat map have a decreased luminous intensity based on an increasing distance from the given path associated with the component; and
providing for display, the heat map overlaid onto a representation of a geometric layout of the environment, wherein the heat map comprises a graphical image.

2. The method of claim 1, further comprising:
determining characteristics of the heat map according to the force being above or below a threshold, wherein the threshold is determined according to a vertical measurement associated with the range of motion.

3. The method of claim 1, wherein determining the motion per path metric associated with the component of the robotic device comprises calculating one or more of an inertia, velocity and radius of curvature associated with the component.

4. The method of claim 1, further comprising:
wherein one or more regions of the heat map along the given path comprise an increased luminous intensity with regard to the luminous intensity associated with a plurality of adjacent regions.

5. A non-transitory computer readable medium having stored therein instructions, that when executed by a computing device, cause the computing device to perform functions comprising:
receiving an input indicative of an environment in which a robotic device resides, and wherein the robotic device is configured to function within the environment;
receiving information associated with the robotic device, wherein the information includes operational characteristics of the robotic device and a range of motion associated with a component of the robotic device;
determining a motion per path metric associated with the component of the robotic device based on a simulated operation of the robotic device moving the component along a given path within the range of motion for the component;
determining a force associated with the motion per path metric according to the simulated operation;
based on the force, determining a heat map to demonstrate a varying effect of motion of the component along the given path, wherein regions of the heat map vary in one or more of color and luminous intensity according to the force, and wherein one or more regions of the heat map have a decreased luminous intensity based on an increasing distance from the given path associated with the component; and
providing for display, the heat map overlaid onto a representation of a geometric layout of the environment, wherein the heat map comprises a graphical image.

6. The non-transitory computer readable medium of claim 5, wherein providing for display, the heat map overlaid onto the representation of the geometric layout of the environment comprises providing the heat map overlaid onto the representation of the geometric layout according to a position of the robotic device within the geometric layout.

7. The non-transitory computer readable medium of claim 5, further comprising:
determining an optimal path for the component to traverse based on safety so as to minimize risk during motion of the component along the optimal path.

8. The non-transitory computer readable medium of claim 5, further comprising:
determining characteristics of the heat map according to the force being above or below a threshold, wherein the threshold is based on a vertical measurement of the range of motion.

9. The non-transitory computer readable medium of claim 8, wherein determining the characteristics of the heat map further comprises:
varying the characteristics according to the range of motion associated with the component of the robotic device.

10. The non-transitory computer readable medium of claim 5, wherein the characteristics vary according to the simulated operation.

11. A method comprising:
receiving, by one or more computing devices, an input indicative of an environment in which a robotic device resides, and wherein the robotic device is configured to function within the environment;
determining a motion per path metric based on a simulated operation of the robotic device;
determining a force associated with the motion per path metric along one or more paths of the robotic device according to the simulated operation;

based on the force, determining, by the one or more computing devices, a heat map to demonstrate a varying effect of motion according to the simulated operation, wherein regions of the heat map vary in one or more of color and luminous intensity according to the force, and wherein one or more regions of the heat map have a decreased luminous intensity based on an increasing distance from the one or more paths of the robotic device; and providing for display, the heat map of the force overlaid onto a three-dimensional representation of a geometric layout of the environment, wherein the heat map comprises a visual representation.

12. The method of claim 11, wherein the heat map of the force overlaid onto the three-dimensional representation of the geometric layout comprises a plurality of forces associated with safety of motion of the robotic device along the one or more paths.

13. The method of claim 11, further comprising determining characteristics of the heat map according to the force being above or below a threshold, wherein the threshold is determined according to a vertical measurement associated with the range of motion.

14. The method of claim 11, wherein the heat map of the force comprises a plurality of voxels along an x-axis, y-axis, and z-axis based on a three-dimensional representation of a geometric layout of the environment, wherein the plurality of voxels vary in one or more of color and luminous intensity according to the force.

15. The method of claim 14, further comprising:

receiving a second input indicative of a request to display one or more voxels of the plurality of voxels according to the force being above a threshold.

* * * * *